(12) United States Patent
Huomo et al.

(10) Patent No.: US 7,920,827 B2
(45) Date of Patent: *Apr. 5, 2011

(54) APPARATUS AND METHOD FOR FACILITATING PHYSICAL BROWSING ON WIRELESS DEVICES USING RADIO FREQUENCY IDENTIFICATION

(75) Inventors: Heikki Huomo, Espoo (FI); Vesa Jutila, Espoo (FI); Petri Vesikivi, Espoo (FI); Janne Jalkanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1279 days.

This patent is subject to a terminal disclaimer.

(21) Appl. No.: 10/180,267

(22) Filed: Jun. 26, 2002

(65) Prior Publication Data

US 2004/0203944 A1  Oct. 14, 2004

(51) Int. Cl.
*H04B 5/00* (2006.01)
(52) U.S. Cl. .................. 455/41.1; 455/456; 235/385
(58) Field of Classification Search .............. 455/456, 455/41.1, 466, 558, 414; 340/825.49; 709/217; 705/14; 713/189
See application file for complete search history.

(56) References Cited

U.S. PATENT DOCUMENTS

| | | |
|---|---|---|
| 5,415,167 A | 5/1995 | Wilk |
| 5,426,594 A | 6/1995 | Wright et al. |
| 5,463,696 A | 10/1995 | Beernink et al. |
| 5,478,989 A | 12/1995 | Shepley |
| 5,499,294 A | 3/1996 | Friedman |
| 5,508,695 A | 4/1996 | Nelson et al. |
| 5,513,117 A | 4/1996 | Small |
| 5,550,535 A | 8/1996 | Park |
| 5,592,375 A | 1/1997 | Salmon et al. |
| 5,629,981 A | 5/1997 | Nerlikar |
| 5,649,296 A | 7/1997 | MacLellan |
| 5,682,024 A | 10/1997 | Koopman et al. |
| 5,682,142 A | 10/1997 | Loosmore et al. |
| 5,740,538 A | 4/1998 | Joyce et al. |
| 5,771,283 A | 6/1998 | Chang et al. |
| 5,794,142 A | 8/1998 | Vanttila et al. |
| 5,821,513 A | 10/1998 | O'Hagan et al. |
| 5,886,646 A | 3/1999 | Watanabe et al. |

(Continued)

FOREIGN PATENT DOCUMENTS

DE  296 13 393 U1  12/1997

(Continued)

OTHER PUBLICATIONS

Want et al., "Bridging Physical and Virtual Worlds with Electronic Tags", Chi '99 Conference Proceedings Human Factors in Computing Systems, pp. 370-377, May 15-20, 1999.

(Continued)

*Primary Examiner* — Phuoc Doan
(74) *Attorney, Agent, or Firm* — Hollingsworth & Funk, LLC (57) ABSTRACT

A system, apparatus, and method for locating available information and services/applications via mobile terminals radio frequency identification (RFID) technology. At least one transponder is provided, having at least an application identifier and associated content, at a location that is accessible to mobile terminal users. The transponder is activated via a wireless signal transmitted by the mobile terminal. The application identifier and content from the activated transponder are received at the mobile terminal when the mobile terminal is physically located within a wireless transmission range of the transponder. In response, an application identified at least in part by the application identifier is invoked on the mobile terminal.

34 Claims, 8 Drawing Sheets

U.S. PATENT DOCUMENTS

| | | | |
|---|---|---|---|
| 5,926,133 | A | 7/1999 | Green |
| 5,949,335 | A | 9/1999 | Maynard |
| 5,959,530 | A | 9/1999 | Lupein, Jr. et al. |
| 6,018,774 | A | 1/2000 | Mayle et al. |
| 6,055,442 | A | 4/2000 | Dietrich |
| 6,177,860 | B1 | 1/2001 | Cromer et al. |
| 6,185,426 | B1 | 2/2001 | Alperovich et al. |
| 6,246,882 | B1 | 6/2001 | Lachance |
| 6,259,367 | B1 | 7/2001 | Klein |
| 6,259,923 | B1 | 7/2001 | Lim et al. |
| 6,269,446 | B1 | 7/2001 | Schumacher et al. |
| 6,295,506 | B1 | 9/2001 | Heinonen et al. |
| 6,370,389 | B1 | 4/2002 | Isomursu et al. |
| 6,370,568 | B1 | 4/2002 | Garfinkle |
| 6,400,272 | B1* | 6/2002 | Holtzman et al. ......... 340/572.1 |
| 6,424,838 | B1 | 7/2002 | Stobbe et al. |
| 6,446,208 | B1 | 9/2002 | Gujar et al. |
| 6,574,604 | B1 | 6/2003 | van Rijn |
| 6,577,901 | B2 | 6/2003 | Thompson |
| 6,611,673 | B1* | 8/2003 | Bayley et al. ................. 455/564 |
| 6,624,752 | B2 | 9/2003 | Klitsgaard et al. |
| 6,629,635 | B1 | 10/2003 | Akamine |
| 6,732,152 | B2 | 5/2004 | Lockhart et al. |
| 6,795,711 | B1 | 9/2004 | Sivula |
| 6,816,725 | B1 | 11/2004 | Lemke et al. |
| 6,839,022 | B1 | 1/2005 | Benco et al. |
| 6,868,340 | B2 | 3/2005 | Alexander et al. |
| 6,912,398 | B1 | 6/2005 | Domnitz |
| 2001/0016479 | A1 | 8/2001 | Wood, Jr. |
| 2001/0051876 | A1 | 12/2001 | Seigel et al. |
| 2002/0008622 | A1 | 1/2002 | Weston et al. |
| 2002/0065680 | A1 | 5/2002 | Kojima et al. |
| 2002/0070862 | A1 | 6/2002 | Francis et al. |
| 2002/0082001 | A1 | 6/2002 | Tanaka et al. |
| 2002/0101519 | A1 | 8/2002 | Myers |
| 2002/0111164 | A1 | 8/2002 | Ritter |
| 2002/0130178 | A1 | 9/2002 | Wan et al. |
| 2002/0131565 | A1 | 9/2002 | Scheuring et al. |
| 2002/0132616 | A1 | 9/2002 | Ross et al. |
| 2002/0177408 | A1 | 11/2002 | Forster et al. |
| 2003/0016804 | A1 | 1/2003 | Sheha et al. |
| 2003/0017804 | A1 | 1/2003 | Heinrich et al. |
| 2003/0064685 | A1 | 4/2003 | Kim |
| 2003/0088496 | A1 | 5/2003 | Piotrowski |
| 2003/0095032 | A1 | 5/2003 | Hoshino et al. |
| 2003/0114137 | A1 | 6/2003 | Eiden |
| 2003/0148774 | A1 | 8/2003 | Naghian et al. |
| 2003/0148775 | A1* | 8/2003 | Spriestersbach et al. ..... 455/456 |
| 2003/0211856 | A1* | 11/2003 | Zilliacus ...................... 455/466 |
| 2003/0220835 | A1* | 11/2003 | Barnes, Jr. ...................... 705/14 |
| 2003/0227392 | A1* | 12/2003 | Ebert et al. ............... 340/825.49 |
| 2004/0002305 | A1 | 1/2004 | Byman-Kivivuori et al. |
| 2004/0015562 | A1* | 1/2004 | Harper et al. ................. 709/217 |
| 2004/0023686 | A1 | 2/2004 | King et al. |
| 2004/0025035 | A1* | 2/2004 | Jean-Claude et al. ........ 713/189 |
| 2004/0063441 | A1 | 4/2004 | Diao et al. |
| 2004/0075752 | A1 | 4/2004 | Valleriano et al. |
| 2004/0087273 | A1 | 5/2004 | Perttila |
| 2004/0117684 | A1 | 6/2004 | Chamberlain |
| 2004/0128197 | A1* | 7/2004 | Bam et al. ........................ 705/14 |
| 2004/0133524 | A1 | 7/2004 | Chamberlain |
| 2004/0147270 | A1 | 7/2004 | Petrovich |
| 2004/0157622 | A1 | 8/2004 | Needham |
| 2004/0185900 | A1 | 9/2004 | McElveen |
| 2004/0198309 | A1 | 10/2004 | Duvall |
| 2004/0203352 | A1* | 10/2004 | Hall et al. .................... 455/41.1 |
| 2004/0203944 | A1 | 10/2004 | Huomo |
| 2005/0054351 | A1 | 3/2005 | McAlexander |
| 2005/0060299 | A1 | 3/2005 | Filley et al. |
| 2006/0128408 | A1 | 6/2006 | Perttila |

FOREIGN PATENT DOCUMENTS

| | | |
|---|---|---|
| DE | 100 42 914 A1 | 4/2001 |
| EP | 0801512 | 10/1997 |
| JP | 2002169783 | 6/2002 |
| WO | WO9728736 | 8/1997 |
| WO | WO 97/46960 | 12/1997 |
| WO | WO9746960 | 12/1997 |
| WO | WO 99/17230 | 4/1999 |
| WO | WO9917230 | 4/1999 |
| WO | WO 99/52723 | 10/1999 |
| WO | WO 00/74406 | 12/2000 |
| WO | WO0074406 | 12/2000 |
| WO | WO 01/06507 | 1/2001 |
| WO | WO0106507 | 1/2001 |
| WO | WO 01/17297 | 3/2001 |
| WO | WO 01/20542 | 3/2001 |
| WO | WO0117297 | 3/2001 |
| WO | WO0120542 | 3/2001 |
| WO | WO 01/73687 | 4/2001 |
| WO | WO 01/39103 | 5/2001 |
| WO | WO 01/39108 | 5/2001 |
| WO | WO0139103 | 5/2001 |
| WO | WO0139108 | 5/2001 |
| WO | WO 01/45319 | 6/2001 |
| WO | WO 01/47291 | 6/2001 |
| WO | WO0145319 | 6/2001 |
| WO | WO0147291 | 6/2001 |
| WO | WO 01/99410 | 12/2001 |
| WO | WO0199410 | 12/2001 |
| WO | WO 02/35773 | 2/2002 |
| WO | WO03063106 | 7/2003 |

OTHER PUBLICATIONS

Office Action with translation dated Apr. 28, 2010 from Korean Application No. 10-2004-7020994, 13 pages.

File History for U.S. Appl. No. 10/600,011 retrieved from U.S. Patent and Trademark Office PAIR System on Nov. 8, 2010, 317 pages.

Office Action dated Oct. 22, 2010 from Korean Application No. 10-2004-7020994, 8 pages.

Date Accessed Jun. 26, 2002 Radio Frequency Identification—A basic primer, Version 1.11, Sep. 28, 1999, http://www.aimglobal.org/technologies/rfid/resources/papers/rfid_basics_primer.htm.

* cited by examiner

| OCTET | DESCRIPTION |
|---|---|
| 0 | ID NUMBER |
| 1 | ID NUMBER |
| 2 | CONTENT TYPE |
| 3 | CONTENT TYPE |
| 4 | TARIFF INFORMATION |
| 5 | TARIFF INFORMATION |
| 6 | LENGTH OF CONTENT |
| 7 + LENGTH | CONTENT OF RFID TAG |
| • | CONTENT OF RFID TAG |
| • | CONTENT OF RFID TAG |
| n-2 | CERTIFICATE FIELD (OPTIONAL) |
| n-1 | CYCLIC REDUNDANCY CHECK SUM |
| n | CYCLIC REDUNDANCY CHECK SUM |

APPARATUS AND METHOD FOR FACILITATING PHYSICAL BROWSING ON WIRELESS DEVICES USING RADIO FREQUENCY IDENTIFICATION

FIELD OF THE INVENTION

This invention relates in general to mobile communications, and more particularly to a system, method and apparatus for locating available information and services/applications via mobile terminals using radio frequency identification technology.

A portion of the disclosure of this patent document contains material which is subject to copyright protection. The copyright owner has no objection to the facsimile reproduction by anyone of the patent document or the patent disclosure, as it appears in the U.S. Patent & Trademark Office patent file or records, but otherwise reserves all copyright rights whatsoever.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

An incredible amount of content, application, services, etc. is already available for use on wireless devices. However, the quantity of information that will be accessible to mobile terminals will increase significantly in the coming years, as further technological advances will continue to diminish the gap between desktop and wireless units. While access to this plethora of information is exciting to the mobile world, locating the desired information and utilizing the various access methods can become burdensome to the casual mobile terminal user. In fact, current mobile data services have taken off relatively slowly, partly due to the inconvenient and complex service discovery solutions offered for users of existing mobile phones.

Current mobile data service discovery and initiation has been accomplished in a variety of ways. Browsing using the Wireless Application Protocol (WAP) generally involves starting from an operator preset service portal, and browsing forward by clicking various menus. Other current mobile data service discovery includes searching for the information required for sending messages, such as Short Message Service (SMS) messages, from various sources such as advertisements. For example, users may be required to search advertisements to find content strings and application numbers. Another existing service discovery method involves mobile terminal configuration settings. Currently, this is often performed by initiating the configuration from a web site or requesting it personally.

Furthermore, some applications or services that might be available for use on a mobile device may be of little value, until the user is physically placed in a particular location where such applications and/or services may be very useful. This has led to a concept generally referred to as location-based services (LBS). However, existing LBSs generally require some form of browsing, messaging, or other specific act on the part of the user, and does not relieve the user of any of the disadvantages of the prior art listed above.

Accordingly, there is a need in the communications industry for a manner of reducing the mobile terminal users' burden of discovering and initiating mobile data services. The present invention significantly reduces the need for the user to sift through numerous network sites, advertisements, documents, etc. to locate services and information when the user is in a situation/location where there is a high probability that the user will want a certain type of information. The present invention fulfills these and other needs, and offers other advantages over the prior art.

SUMMARY OF THE INVENTION

The present invention is directed to a system, apparatus, and method for locating available information and services/applications via mobile terminals, as well as facilitating receipt of other information such as configuration/provisioning information, via electromagnetic/electrostatic coupling technology such as radio frequency identification (RFID) technology.

In accordance with one embodiment of the invention, a method is provided for locating information via physical browsing by a mobile terminal. The method includes providing at least one transponder, having at least an application identifier and associated content, at a location that is accessible to mobile terminal users. The transponder is activated via a wireless signal transmitted by the mobile terminal. At least the application identifier and content from the activated transponder are received at the mobile terminal when the mobile terminal is physically located within a wireless transmission range of the transponder. In response, an application identified at least in part by the application identifier is invoked on the mobile terminal.

In accordance with another embodiment of the invention, a method is provided for facilitating physical browsing by mobile terminals of information stored on transponders having at least an application identifier and content stored thereon. The method includes transmitting a radio frequency (RF) activation signal from the mobile terminal, and activating a transponder in response to the RF activation signal when the transponder is within an RF transmission range of the mobile terminal. At least the application identifier and the content is received from the activated transponder at the corresponding mobile terminal when the mobile terminal is within a backscatter transmission range of the transponder. A local application is located on the mobile terminal using the application identifier. The content is provided to the local application, and the local application is then executed using at least a portion of the content.

In accordance with another embodiment of the invention, a mobile terminal is provided. The mobile includes a radio frequency reader module, that includes a transceiver to send activation signals recognizable by transponders, and to receive at least an application identifier and content in response to the transponder being activated by the activation signals. A memory within the mobile terminal stores at least one local application and a reader application. A processor is coupled to the memory and to the radio frequency reader module. The processor is configured, as directed by the reader application to invoke at least one of the local applications identified by the application identifier and to provide the content to the local application.

In accordance with another embodiment of the invention, a system for facilitating physical browsing for information by mobile terminals is provided. The system includes at least one transponder having at least an application identifier and content stored thereon. The transponder is capable of transmitting the application identifier and the content in response to an activation signal. The system further includes at least one mobile terminal. The mobile terminal includes a radio frequency reader module having a transceiver to send the activation signal, and to receive the application identifier and content in response to the transponder being activated by the activation signal. The mobile terminal includes a memory for storing one or more local applications and a reader application. A processor is coupled to the memory and the radio frequency reader module, where the processor is configured to invoke at least one of the local applications identified by the application identifier, and to provide the content to the local application, as directed by the reader application.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides an apparatus, system, and method for locating available information and services/applications via mobile terminals, as well as facilitating receipt of other information such as configuration/provisioning information, via electromagnetic/electrostatic coupling technology. In one embodiment, this electromagnetic/electrostatic coupling is implemented in the radio frequency portion of the electromagnetic spectrum, using radio frequency identification (RFID). A mobile device is equipped with an RFID reader, and transponders or "tags" are activated by radio frequency waves emitted by the mobile terminal. When activated, the tag transmits information to the mobile terminal reader. In one embodiment of the invention, the tag provides an address(es), e.g., a Uniform Resource Locator (URL), to content desired by the user. The content itself may also be provided via the tag. In this manner, "physical browsing" is facilitated where the mobile terminal user comes in proximity to a tag that provides information that would otherwise require browsing or other means for searching for such information. The invention also provides a convenient manner of provisioning mobile terminals or providing other configuration information, by providing this provisioning and/or configuration information via RFID tags.

Figure 1:
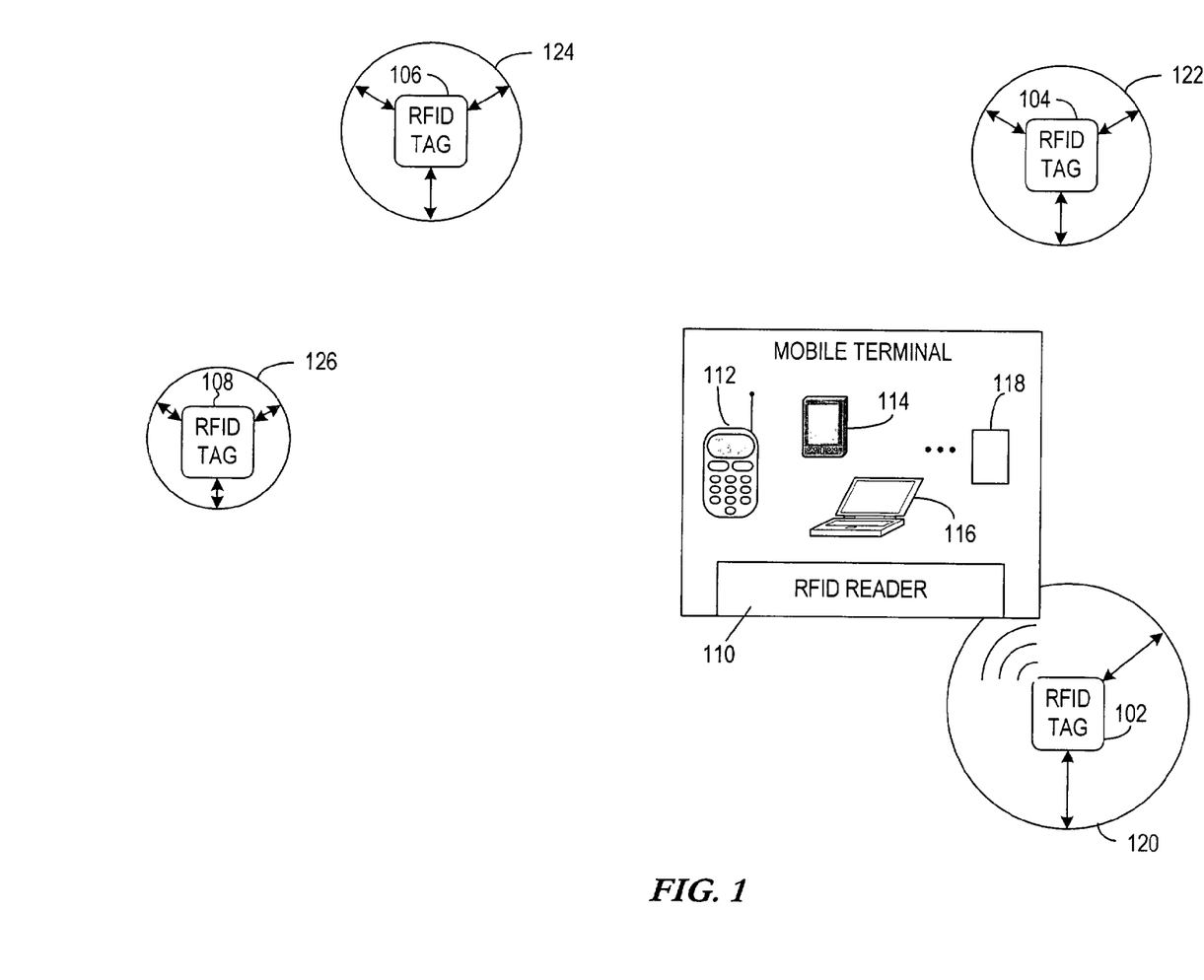
FIG. 1 is a block diagram illustrating an exemplary embodiment of the service discovery and initiation, i.e., "physical browsing," in accordance with the present invention.

FIG. 1 is a block diagram illustrating an exemplary embodiment of the service discovery and initiation, i.e., "physical browsing," in accordance with the present invention. In the illustrated embodiment, a mobile terminal 100 moves from place to place, and actions, applications, services, etc. can be initiated when the mobile terminal 100 comes within a certain range of a transponder. More particularly, one embodiment of the invention involves providing various transponders or "tags" based on radio frequency identification (RFID) technology. FIG. 1 depicts a number of such tags, namely RFID tags 102, 104, 106, 108. When the mobile terminal 100 comes within a certain range of a tag, the RFID reader 110 associated with the mobile terminal will read the information from the respective RFID tag. Any type of wireless/mobile terminal 100 equipped with an RFID reader 110 in accordance with the present invention may be used, such as a cellular telephone 112, a personal digital assistant (PDA) 114, a notebook or laptop computer 116, or any other type of wireless terminal represented by device 118.

RFID technology utilizes electromagnetic or electrostatic coupling in the radio frequency (RF) portion of the electromagnetic spectrum. The RFID reader 110 includes at least an antenna and transceiver (not shown in FIG. 1). An RF signal is transmitted from the RFID reader 110 that activates the tags 102, 104, 106, 108 when touched to, or within a predetermined range of, the tags. When a tag has been activated, it transmits information back to the RFID reader 110. More particularly, in the case of a passive tag (described below), the tag may be energized by a time-varying electromagnetic RF wave generated by the RFID reader 110. When the RF field passes through the antenna coil associated with the tag, a voltage is generated across the coil. This voltage is ultimately used to power the tag, and make possible the tag's return transmission of information to the reader, sometimes referred to as backscattering.

Using this information, the RFID reader 110 can direct the mobile terminal 100 to perform an action identified from the received information. One advantage of RFID is that it does not require direct contact, although direct contact with an RFID tag can occur, and in some instances may be required. The frequency employed will at least partially dictate the transmission range of the reader/tag link. The required proximity of the mobile terminal 100 to a tag can range from a very short range (touching or near touching) to many meters, depending on the frequency employed and the power output. Each of the RFID tags shown in FIG. 1 illustrate a range for that RFID tag. For example, when the mobile terminal comes within a range 120 of RFID tag 102, the tag 102 can receive the signal from the RFID reader 110 and respond with the desired information. Other ranges 122, 124, 126 are illustrated for RFID tags 104, 106, 108 respectively.

It should also be noted that one embodiment of the invention involves a tag having substantially no transmission range, but rather may include contacts that physically couple to corresponding contacts on the mobile terminal 100. While such an embodiment will be unable to avail itself of some of the benefits of RFID or other analogous technology, such an embodiment is feasible in connection with the present invention.

Any type of RFID tag may be used in connection with the present invention. For example, RFID tags can be either active or passive. Active tags require an internal battery and are often read/write tags. Passive tags do not require a dedicated power source, but rather obtain operating power generated from the reader. Further, tags may come in a variety of shapes and sizes, but are generally based on a custom designed silicon integrated circuit. Any transponder/tag may be used in connection with the present invention, and the tag type, size, etc. depends on the particular environment and purpose in which physical browsing in accordance with the invention will be employed.

Any number of such tags can be positioned at various locations in which a user may physically encounter. For example, such tags can be located at retail stores, hotels, restaurants, night clubs, bus stops, train stations and airports, offices, taxis, conference centers, etc. Any place where it is advantageous for the tag provider to provide information and/or convenient for the mobile terminal user to obtain such information is a candidate for a tag location in accordance with the present invention. For example, a restaurant may embed a tag outside its front door or in an entry door frame that provides the restaurant menu. Alternatively, the tag may provide an address, such as a Uniform Resource Locator (URL), to the restaurant's site where reservation and/or current seating wait times may be obtained. As another example, a night club may use such a tag to provide taxi service information, such as taxi service contact information, or even to initiate a taxi request. Such a tag can be attached or embedded into the night club door frame, tables, or a dedicated taxi station or kiosk located therein. The night club can provide one or more taxi service contact numbers of the best or closest taxi service.

As can be seen from the foregoing, the possibilities for such physical browsing are virtually limitless. By utilizing physical tags in this manner, mobile terminal users are relieved of the burden of having to "electronically" browse for certain information that is likely to be associated at that physical location. For example, because essentially all restaurants have menus and possible seating wait times, it is foreseeable that a person will want to know that information while physically near the restaurant. Rather than requiring a passer-by to go into the restaurant to ask for this information, or requiring the person to electronically browse for this information via his/her wireless device, it can simply be provided at the restaurant site, i.e., the passer-by's current location.

Figure 2:
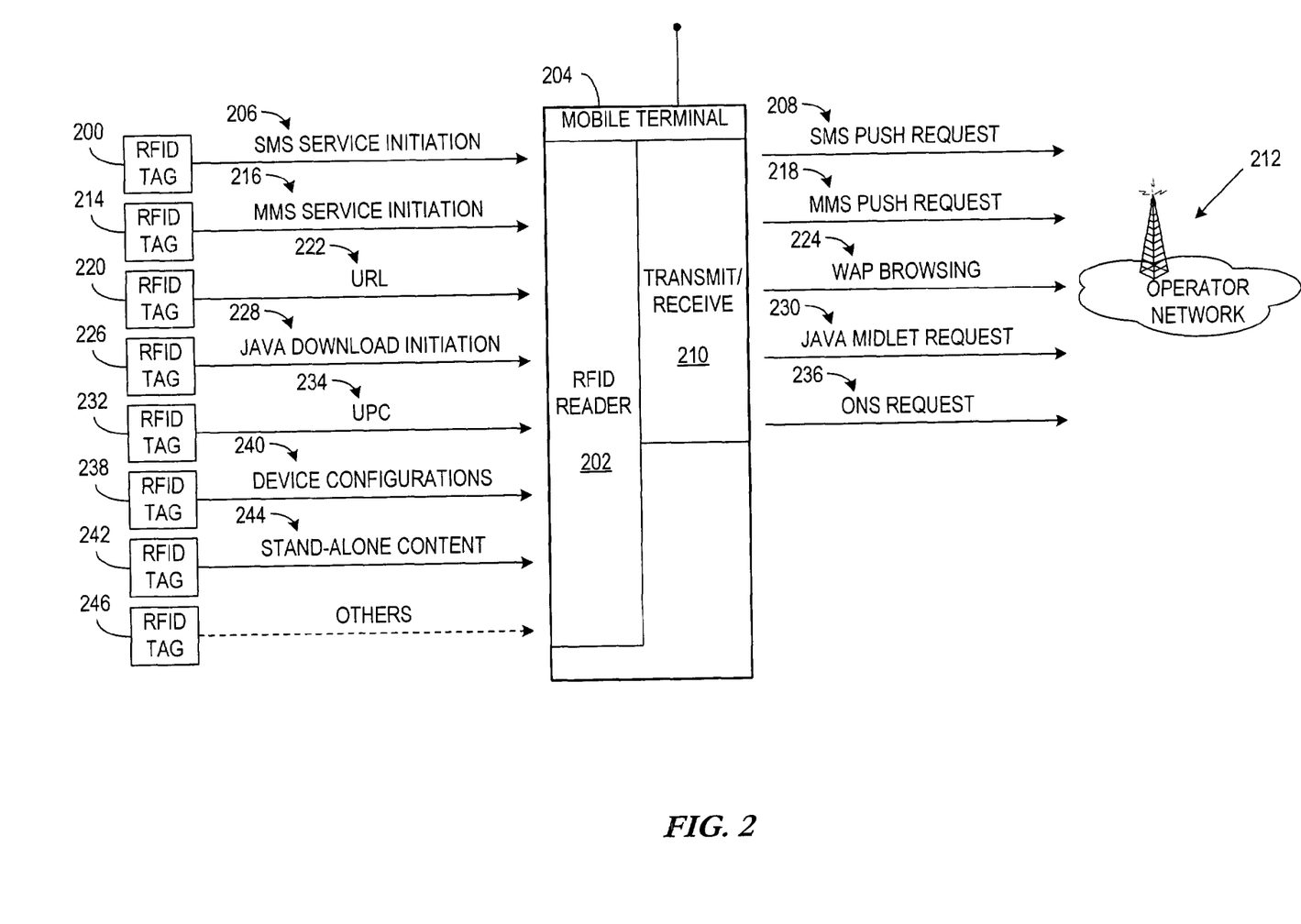
FIG. 2 illustrates a number of representative service types that may be initiated using RFID physical browsing in accordance with the present invention.

FIG. 2 illustrates a number of representative service types that may be initiated using RFID physical browsing in accordance with the present invention. For purposes of facilitating an understanding of this aspect of the invention, each representative service type is shown as being associated with a different RFID tag. RFID tag 200 is depicted as initiating a first service type, namely Short Messaging Service (SMS). Assuming for purposes of discussion that the tag 200 is a passive tag, the RFID reader 202 associated with the mobile terminal 204 provides a signal, and when the RFID tag 200 receives the signal, it returns an SMS service initiation response 206. As will be described more fully below, the information associated with the SMS service initiation response 206 includes an identifier to identify an application on the mobile terminal 204 to initiate, and content. A reader application in the mobile terminal 204 feeds the content portion of the tag response 206 into another application on the mobile terminal 204 based on the identifier. In this embodiment, an SMS application will be invoked, and an SMS message and premium service SMS number will be sent to the service provider, depicted by the SMS push request 208 sent via the transceiver 210 to the operator network 212.

Another representative service type that can be initiated is Multimedia Message Service (MMS). RFID tag 214 provides an MMS service initiation response 216 in the manner described above. The reader application in the mobile terminal 204 feeds the content portion of the tag response 216 to an application on the mobile terminal based on the identifier associated with the tag 214. An MMS application will be invoked, inviting a premium MMS by way of, for example, an MMS push request 218 sent to the operator network 212.

Wireless Application Protocol (WAP) browsing, or an analogous protocol facilitating mobile browsing, is another representative service type that can be initiated in accordance with the invention. As is known in the art, WAP is a set of protocols that accounts for characteristics and functionality of both Internet standards and standards for wireless services, and integrates the Internet and other networks with wireless network platforms. WAP thus bridges the gap between the wireline Internet paradigm and the wireless domain, to allow wireless device users to enjoy the benefits of the Internet across both platforms. In an embodiment where WAP browsing is the service type, the tag 220 provides an application identifier to a WAP browsing application on the mobile terminal 204, along with content including an address, e.g., URL 222. Upon invoking the WAP browser, the mobile terminal will connect to the specified URL by way of WAP browsing 224. The mobile terminal 204 may use a preset WAP gateway address to connect to the specified URL.

Another representative service type is a Java download (or analogous programming technology). The tag 226 provides a Java download initiation response 228 in response to the signal provided by the mobile terminal 204, which is read by the RFID reader 202. The RFID reader 202 provides the content portion to an application on the mobile terminal 204, ultimately leading to the transmission of a Java (for example) application request such as a Java MIDlet request 230, where a MIDlet generally refers to a small Java application (e.g., applets) that runs on compliant mobile devices. Once the Java application is downloaded, it can be executed on the mobile terminal 204. It should be recognized that the present invention is equally applicable to other analogous programming technologies, and Java is referred to herein as a representative example. Thus, as used in the specification and claims provided herein, references to Java applications are intended to include other similar programming languages that can be used on mobile terminals.

An ONS request is another example of a service type that can be initiated in accordance with the invention. An RFID tag 232 can provide content such as a Universal Product Code (UPC) 234, or an analogous code such as an Electronic Product Code (EPC). The identifier associated with the tag 232 information can initiate a program that provides a request to the operator network 212, such as an Object Naming Service (ONS) request 236. An ONS is a service available via the operator network 212 for looking up UPCs and/or EPCs from which information can then be provided. Therefore, such a request 236 will ultimately lead to the network 212 providing the requested information back to the mobile terminal.

The service types described thus far involve some communication with an operator network 212. However, the present invention is applicable to situations where no ultimate network connection is involved. RFID tag 238 illustrates one such situation, where device configurations 240 are provided to the mobile terminal 204. For example, these configurations may be initial settings for WAP, SMS, MMS, etc. or other provisioning information. For example, an RFID tag 238 may be provided to a purchaser of a mobile telephone along with the new mobile telephone. The tag 238 may be provided to the user at the time of purchase, separate from the mobile telephone packaging, as a theft-protection mechanism where the tag 238 is required to provision the mobile device. Alternatively, such a tag can be provided inside, or integral with the packaging itself. The mobile device can then be provisioned or otherwise configured for certain uses via information provided by the RFID tag 238. For example, the tag 238 identifier can identify the application on the mobile terminal 204 that is to be activated, and the content associated with the tag 238 can provide the provisioning information, which may include initial WAP, SMS, MMS, EMS, etc. information. Alternatively, the RFID tag 238 may provide a URL to direct the user to a provisioning/configuration site. Other configurations for the mobile terminal can also be provided by the tag 238. A person could purchase an RFID sticker that includes certain mobile terminal configurations, such as user profiles, wall paper, user-interface "skins," FM radio channels, Digital Video Broadcast-terrestrial (DVB-T) keys, etc.

Further, a tag 242 can similarly be used to provide standalone content 244 to the mobile terminal 204. This content may be, for example, text, images, business cards, etc. In one embodiment, the content is provided to the RFID reader 202 via a smart message interface, which is described more fully below. Other RFID tags 246 can be associated with other service types and provide different types of content in accordance with the principles of the present invention.

Figure 3:
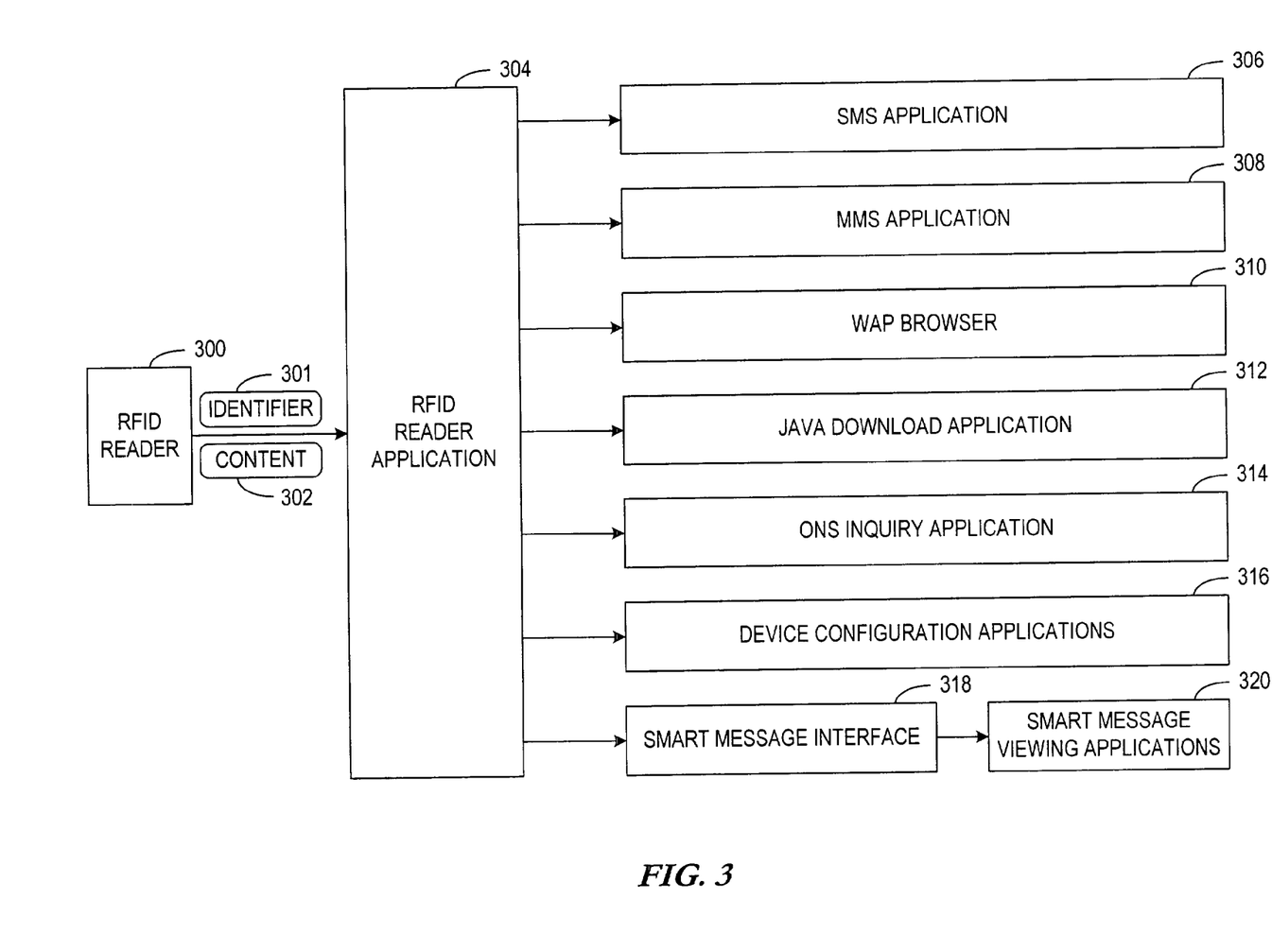
FIG. 3 is a block diagram illustrating one embodiment of a mobile terminal implementation incorporating the physical browsing principles of the present invention.

FIG. 3 is a block diagram illustrating one embodiment of a mobile terminal implementation incorporating the physical browsing principles of the present invention. The mobile terminal is equipped with an RFID reader 300, which includes at least a receiver. After transmitting a signal to activate one or more tag(s), it receives identifier and contact information from the tag. The reader 300 forwards the identifier 301 and content 302 to an RFID reader application 304. The identifier 301 is used to locate an appropriate application to initiate, and the content 302 is used by the located application. For example, the RFID reader application 304 can initiate an SMS application 306 using the identifier 301 to designate the SMS application 306. The content 302 can then be provided to the SMS application 306 for use in the appropriate manner, such as to send an SMS message and SMS service number to the operator network.

The reader application 304 can initiate a wide variety of different types of applications. Applications other than the SMS application 306 include an MMS application 308, WAP browser 310, Java download application 312, ONS inquiry application 314, device configuration applications 316, smart message interface 318 and associated viewer applications 320, and the like. An MMS application 308 identified by the identifier 301 can invite a premium MMS to be provided to the mobile terminal. One manner of effecting this is to notify the mobile terminal of an MMS via an SMS message, and to have the mobile terminal read the MMS content via a WAP browser. This would invoke the WAP browser 310, which in turn initiates a WAP session at a particular URL. The WAP browser 310 would also be initiated where the identifier 301 specifies the WAP browser 310, and provides content 302 such as a URL to the WAP browser to initiate a WAP session at that URL.

A Java download application 312 can be initiated by the appropriate identifier 301, which will initiate a Java download. A number of different variations of information can be stored in the RFID tags as the content 302. More particularly, a Java program typically includes three parts, including 1) class files which are the executable bytecode of a program; 2) the dynamic state of classes (i.e., the serialized state); and 3) deployment descriptors such as Extensible Markup Language (XML) files that, for example, describe how a Java program is to be executed, etc. In a typical Java program deployment, a Java Archive (JAR) file is distributed which includes the class files and the deployment descriptors. With MIDlets, there is a separate deployment descriptor file accompanying the JAR file. The class files, dynamic class state, and deployment descriptors can be stored in RFID tags in different combinations.

As a first example, the serialized information may be included in the tag, along with the URL where the actual bytecode may be retrieved. If the URL is fixed, the same can be done with the class name as a unique identifier, with the Java Virtual Machine classloader downloading the required executable bytecode. As another example, a Java Network Launching Protocol (JNLP) file, which is a Java Webstart launch file of deployment descriptors, can be stored on the tag. The JNLP file includes a description of the program and a URL from which the class files can be downloaded. The mobile terminal can cache the class files in the event that the same program would be started again from a different RFID tag. Another example is to put the bytecode and a deployment description on the tag, possibly in a compressed format to save space. Still another example is to include the code and the serialized information on the tag. This could facilitate sharing of MIDlets between mobile terminal users.

A more particular application using a Java download application 312 is to allow MIDlets, or limited versions referred to herein as "sniplets," to be transferred freely from one mobile device to another. The sniplet itself may or may not offer much value on its own, but it can be used to enable other services. For example, a restaurant might have an RFID tag that distributes a small sniplet containing the name, address, and a menu of the restaurant. If the restaurant is a popular restaurant, people may start storing and taking the sniplets with them to distribute to others.

Such a MIDlet/sniplet can include one or both of the class code and the serialized information. Serialized data contains the class name, which is a unique identifier allowing the receiving device to download the required data from the network. For example, the restaurant sniplet may be as follows:

```
public class RestaurantSniplet extends com.nokia.sniplet.GenericSniplet
{
    String restaurantName;
    String restaurantAddress;
    String restaurantURL;
    String menu;
    public byte[ ] serialize( );
    public void unserialize( byte[ ] data );
}
```

The restaurant RFID tag may include information in serialized format such as:
    class=com.nokia.sniplet.RestaurantSniplet;
    restaurantName=Kabuki;
    menu=sushi, 5€

When the mobile terminal receives this serialized data, it will check if it already has a class called "com.nokia.sniplet.RestaurantSniplet" in memory. If it has, it can combine the class and the data into a new instance. In such a case, there is less data and thus bandwidth is saved. For example, if the information associated with one hundred restaurants was saved, the code would only need to be stored in memory once, while the dynamic data would be stored one hundred times. Storing the code only once results in a significant reduction in the required storage.

Returning to FIG. 3, the identifier 301 may also designate an ONS inquiry application 314, where the content 302 would include one or more UPCs or EPCs. In this case the mobile terminal can use, for example, a predetermined WAP gateway address to connect to a broker site where the UPC/EPC is converted to a URL that can be used to obtain information from a WAP server. The retrieved URL can then be used via a browser, such as a WAP browser. The identifier 301 may also designate a device configuration application 316 that will configure settings such as WAP/SMS/MMS settings, profiles, wallpaper, user interface skins, etc. The content 302 would provide the data corresponding to the new configuration.

As previously described, RFID tags may be used to provide configuration data and/or other stand-alone content to the mobile terminal via the RFID reader 300. The identifier 301 will identify an appropriate application, which will be invoked with the assistance of the RFID reader application 304. In one exemplary embodiment, the identifier 301 designates a smart message interface 318 to be invoked, and the content 302 includes any type of content that can be accommodated by a smart message interface. As is known in the art, "smart messaging" is a concept for sending and receiving content over an over-the-air (OTA) message service such as SMS. Using the smart messaging protocol, content such as business cards (e.g., vCard), ring tones, logos, picture messages, Java MIDlets, calendar entries, network access settings, etc. can be sent OTA. Smart messaging is essentially a special type of text message having its own prefixes and codes that makes it possible for a mobile terminal to recognize the message as a functional message rather than a text message directed to the mobile terminal user.

The smart message interface 318 facilitates the proper receipt of RFID tag information provided in accordance with the smart messaging protocol. The tag contains the smart message content 302 (or other content such as EMS content). Once properly received, the mobile terminal can display the content on a local display with the assistance of one or more smart message viewing applications 320. In addition, the mobile terminal user can optionally elect to edit the content and/or forward it to others. Providing content 302 to the mobile terminal using smart messaging is advantageous as not all mobile terminal users are equipped with the physical tools (e.g., digital cameras) or skills required to create visual messages, but they can obtain them from the tags that are strategically located. For example, an RFID tag at a tourist attraction can provide an image associated with that location to the RFID reader 300 using the smart messaging (or other) protocol, thereby instantly providing the tourist with an image of vacation sites that were visited. As another example, a business executive may have an RFID tag in or near his/her office that includes a vCard that can be instantly transmitted to a visitor's mobile terminal using the smart messaging (or other) protocol. A wide variety of other applications exist as well, and the foregoing examples are intended only as representative examples.

Figure 4:
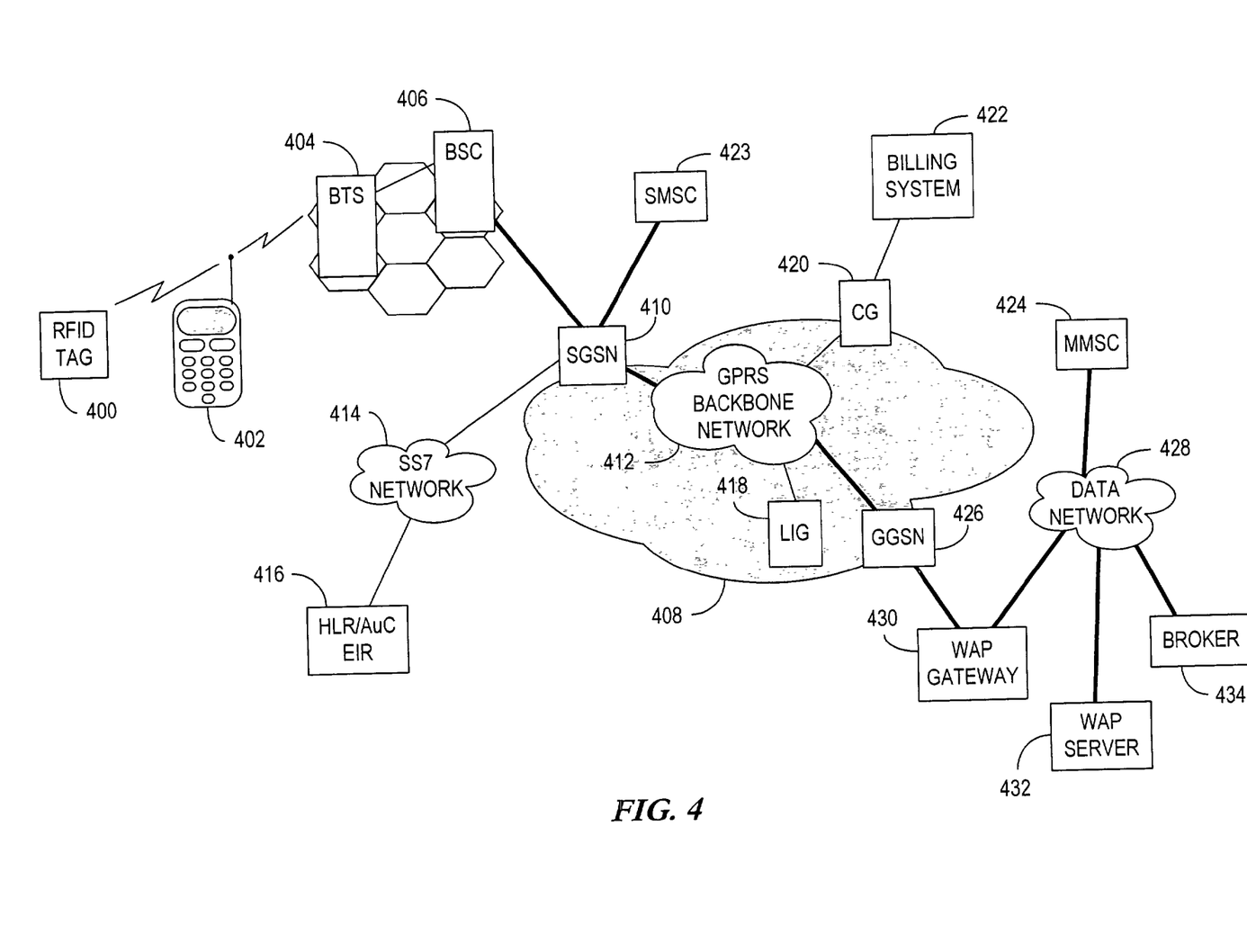
FIG. 4 is a diagram illustrating an exemplary embodiment of a system-level implementation of RFID-based service initiation of message services including SMS, EMS, and MMS.

FIG. 4 is a diagram illustrating an exemplary embodiment of a system-level implementation of RFID-based service initiation of message services including SMS, EMS, and MMS. These service types involve communication with an operator network after the mobile terminal has communicated with the RFID tag and obtained the tag content. As described in connection with FIG. 2, the RFID tag 400 may provide an SMS, MMS, etc. service initiation response to the mobile terminal 402 that has come within a certain proximity of the tag 400. The tag information is read into the mobile terminal 402 via its reader, and the reader application invokes the appropriate SMS, MMS, etc. application based on the identifier provided by the tag 400. The SMS/MMS application will then need to communicate with the operator network in order to receive the message corresponding to the SMS/MMS invitation.

Figure 5:
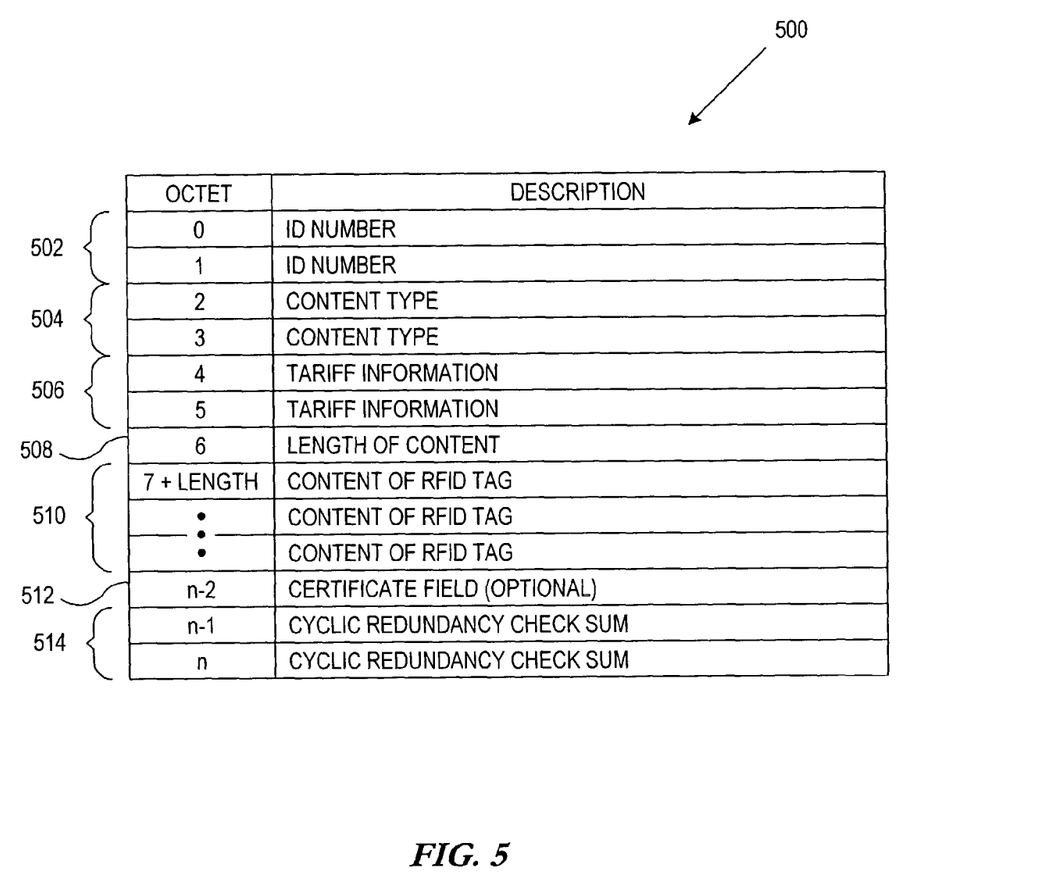
FIG. 5 illustrates a general diagram of an exemplary tag information block.

The SMS/MMS embodiment described herein is applicable in any number of network systems. For purposes of illustration and not of limitation, FIG. 4 is described in the context of a General Packet Radio System (GPRS) mobile communications network. GPRS is a packet-switched service for Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiments of FIGS. 4 and 5 are generally described in connection with GPRS, and GSM which is the underlying digital technology of GPRS, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

Referring to FIG. 4, the mobile terminal 402 communicates with the base transceiver station (BTS) 404 via an air interface. The BTS 404 is a component of the wireless network access infrastructure that terminates the air interface over which subscriber traffic is communicated to and from the mobile terminal 404. The Base Station Controller (BSC) 406 is a switching module that provides, among other things, handoff functions, and controls power levels in each BTS 404. The BSC 406 controls the interface between a Mobile Switching Center (MSC) (not shown) and BTS 404 in a GSM wireless network 408, and thus controls one or more BTSs in the call set-up functions, signaling, and in the use of radio channels. The BSC 406 also controls the interface between the Serving GPRS Support Node (SGSN) 410 and the BTS 404 in a GPRS network 412.

The Serving GPRS Support Node (SGSN) 410 serves GPRS mobile by sending or receiving packets via a Base Station Subsystem (BSS), and more particularly via the BSC 406 in the context of GSM systems. The SGSN 410 is responsible for the delivery of data packets to and from the mobile terminals 402 within its service area, and performs packet routing and transfer, mobility management, logical link management, authentication, charging functions, etc. In the exemplary GPRS embodiment shown in FIG. 4, the location register of the SGSN 410 stores location information such as the current cell and Visiting Location Register (VLR) associated with the terminal 402, as well as user profiles such as the International Mobile Subscriber Identity Number (IMSI) of all GPRS users registered with this SGSN 410.

The SGSN 410 may also connect to a Signaling System 7 (SS7) network 414, which is a system on the Public Switched Telephone Network (PSTN) that performs out-of-band signaling in support of the call establishment, billing, routing, and information exchange functions of the PSTN. The SS7 network 414 communicates with network elements such as an Authentication Center (AuC), Home Location Register (HLR), Equipment Identity Register (EIR), etc., collectively shown at block 416. The network 408 may include other network elements, such as a Lawful Interception Gateway (LIG) 418 that allows authorities to intercept GPRS mobile data calls, and a Charging Gateway (CG) 420 that serves as an intermediary with various Operations Support Systems (OSS) elements such as charging and billing systems 422.

An SGSN 410 is ultimately coupled to a Short Message Service Center (SMSC) 423 and/or Multimedia Message Service Center (MMSC) 424 in connection with the presently described embodiment. While GSM forms the underlying technology, the SGSN 410 described above is a network element introduced through GPRS technology. Another network element introduced in the GPRS context is the Gateway GPRS Support Node (GGSN) 426, which acts as a gateway between the GPRS network 412 and a packet switched public data network, such as network 428. This gateway 426 allows mobile subscribers to access the public data network 428 or specified private IP networks. The connection between the GGSN 426 and the public data network 428 is generally enabled through a standard protocol, such as the Internet Protocol (IP), and further may be coupled through a WAP gateway 430.

With the aforementioned network system described as a representative network environment, the SMS/MMS physical browsing embodiment is now described. The content portion provided by the RFID tag 400 is read to the mobile terminal 402, which in turn invokes an MMS or SMS application that sends an SMS message and premium SMS number to the service provider. In the case of inviting an SMS message, the SMS will ultimately be delivered by the SMSC 423 to the mobile terminal 402. In the case of inviting an MMS message, an SMS message may notify the user of the MMS message which can be read at the mobile terminal 402 via a browser, such as a WAP browser. In either case, the content of the message received via the SMSC 423 or MMSC 424 can include advertisements, entertainment, ticket information, etc.

In the case where the RFID tag 400 identifies a WAP browser as the targeted application and provides a URL as content, the mobile terminal 402 will initiate the WAP browser and transmit the URL to the network. In one embodiment, the mobile terminal 402 may include a preset WAP gateway address for the WAP gateway 430 to connect to the specified URL at the WAP server 432. The RFID tag 400 could, in some embodiments, also provide the WAP gateway address.

In the case where the RFID tag 400 identifies an application to generate an ONS request and provides a UPC or EPC as the content, the mobile terminal 402 will issue such a request to the network. In one embodiment, the mobile terminal 402 may include a preset WAP gateway address of the WAP gateway 430, or the RFID tag 400 may also provide the WAP gateway address. The mobile terminal 402 uses this address to connect to a broker site 434 identified by a first URL that may be provided with the tag 400 content, where the UPC/EPC is converted to a second URL based on the subscription of service or other predetermined parameter. The information is then obtained using the second URL from the WAP server 432.

The manner in which the identifiers and content is provided to the mobile terminal reader may vary in accordance with the present invention. For example, variations of existing protocols may be used, such as the smart messaging protocol described above in connection with RFID tags providing stand-alone content, or the Narrow Band Socket (NBS) protocol. Tag data can therefore be provided in an extended NBS format where, in addition to standard NBS fields, other information associated with the present invention may be provided such as service type (e.g., SMS, MMS, WAP, etc.), tariff classes (e.g., free, fee-based, etc.), RFID content lengths, as well as the content itself. FIG. 5 illustrates a general diagram of an exemplary tag information block 500, which may be implemented as shown or as a basis in connection with other known formats or protocols in order to provide the requisite information from the RFID tag to the mobile terminal reader.

In the exemplary embodiment of FIG. 5, the information block 500 includes the identifier 502 used to identify an application on the mobile terminal that is to be initiated. In the illustrated embodiment, two bytes of information are reserved for the identifier (ID NUMBER). One embodiment includes providing a content type 504, which defines the type of content that is provided via the RFID tag. For example, the content types may include SMS, MMS, URL for use with WAP browsing, Java program download request and/or Java programs (e.g., MIDlets), UPC/EPC, smart message, and the like. Each of these and other content types can be identified via the content type field 504.

Where fees may be associated with a service request, the RFID information block 500 may include tariff information 506. For example, a 00H may represent that there is no associated cost. The remaining possible values are of a tariff class (or undefined) to be set by the service operator, where the actual cost may be printed visually on the RFID tag. The actual price need not be stored on the RFID tag, but rather just the tariff class. By providing tariff information 506 within the RFID tag, a user can selectively put his/her mobile terminal into a mode where fee-based services will not be used. Companies who provide mobile terminals to their employees may also find this to be quite beneficial. This also provides the user with the option of selecting a threshold cost that is willing to be paid, such as a 1 Euro limit. In this manner, RFID tags identifying a fee can automatically be identified at the mobile terminal as being within or outside of the predefined limit. The fee information can ultimately be displayed to the user via the mobile terminal display. Such limits may be based on information other than cost that is provided with the tag information 500, such as the content type itself. The mobile terminal can, for example, reject certain graphics or images where the user does not want to store memory-intensive content. Other parameters not shown in FIG. 5 that enable the user to set certain limits or thresholds may also be provided via an RFID tag.

The tag information block 500 may also include a content length field 508, which indicates the length of the content 510 portion of the tag information. Representative types of content that can be included as content 510 in the tag information 500 have been previously described. An optional certificate field 512, illustrated as one octet but of any desired length, may be provided. This field 512 may be used, for example, to provide an electronic signature to guarantee authenticity of the service provider, from which the user may access the public key location and verify the signature based on Public Key Infrastructure (PKI) policies. A check sum field, such as Cyclic Redundancy Check (CRC) field 514, may also be provided with the tag information 500. The CRC information may be used to determine whether errors occurred in connection with the reading of the tag information 500. Other and/or different information may also be provided, as the present invention contemplates any number of different tag content types, formats, fields, etc.

Figure 6:
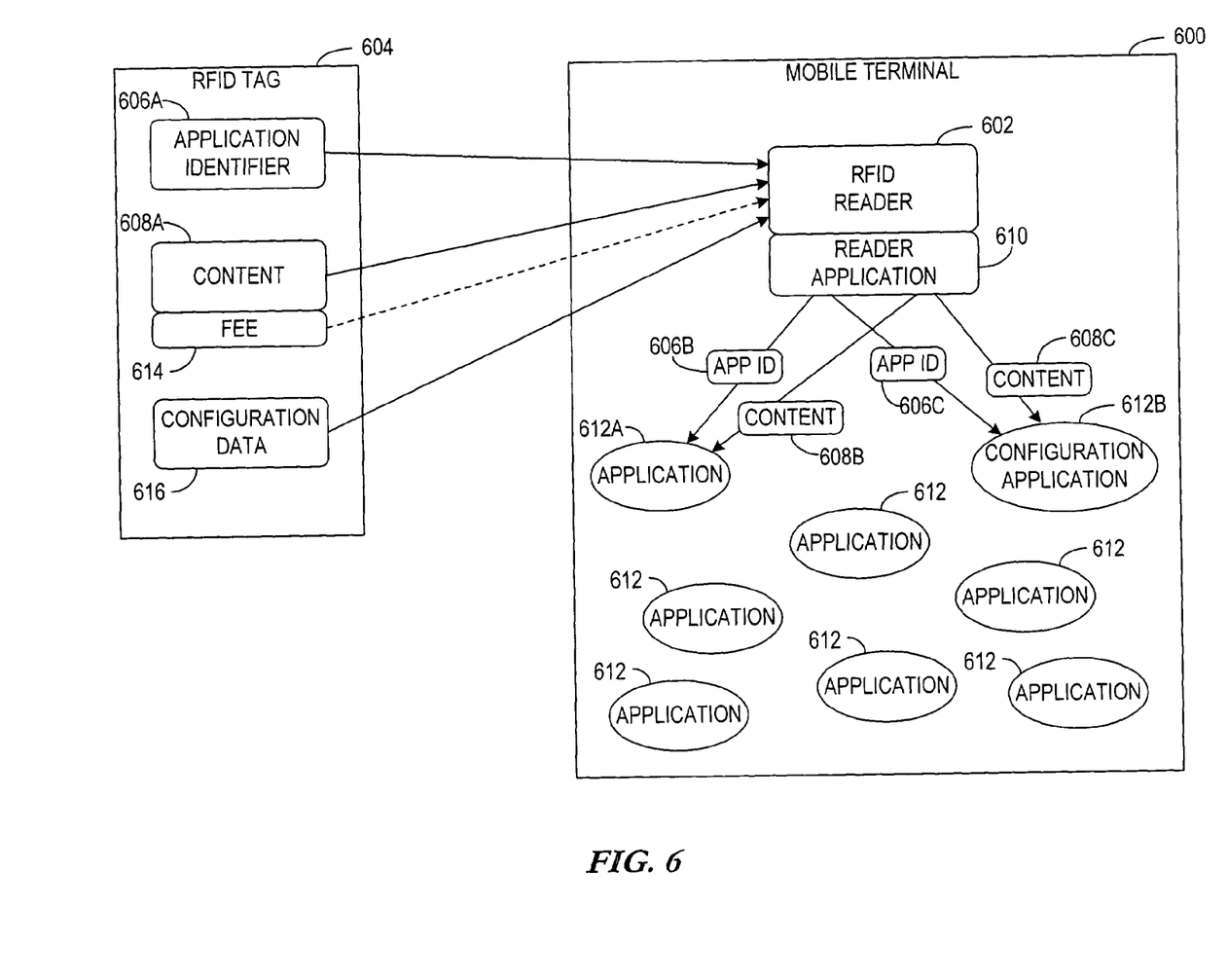
FIG. 6 is a block diagram illustrating exemplary manners in which RFID identifiers and content as described above are used by a mobile terminal reader and reader application to invoke a particular application and initiate the corresponding action.

FIG. 6 is a block diagram illustrating exemplary manners in which RFID identifiers and content as described above are used by a mobile terminal reader and reader application to invoke a particular application and initiate the corresponding action. The mobile terminal 600 includes an RFID reader 602, which receives information from the RFID tag 604. As previously described, the RFID tag 604 may be an active or passive tag. Assuming a passive tag 604, the mobile terminal 600 will initiate a signal that is recognized by the tag 604 when the mobile terminal 600 is within a certain distance of the tag 604. The tag 604 will respond with at least an application identifier (ID) 606A and some form of content 608A. The RFID reader 602 receives the application ID 606A and content 608A, such as via a receiver or transceiver. A reader application 610 receives the application ID and content from the reader 602, and invokes one (or more) of a plurality of potential applications 612. It is also possible that only one application resides on the mobile terminal. Using the application ID 606B, the appropriate application 612 can be invoked, such as the SMS application 612A. The associated content 608B is also provided for use by the application 612A. Each application 612 is uniquely identified so that the correct application 612 may be invoked using the application ID 606B. The "content" as used in connection with FIG. 6 may include other information such as fee information 614, as described in connection with FIG. 5.

In another embodiment, the content provided is in the form of configuration data 616. The RFID reader 602 receives the application ID 606A and the configuration data 616, and provides this information to the reader application 610. In turn, the reader application invokes the appropriate configuration application 612B using the application ID 606C and the content/configuration data 608C. Again, the application ID 608C uniquely identifies the appropriate application resident on the mobile terminal 600, or otherwise accessible to the mobile terminal 600.

Figure 7:
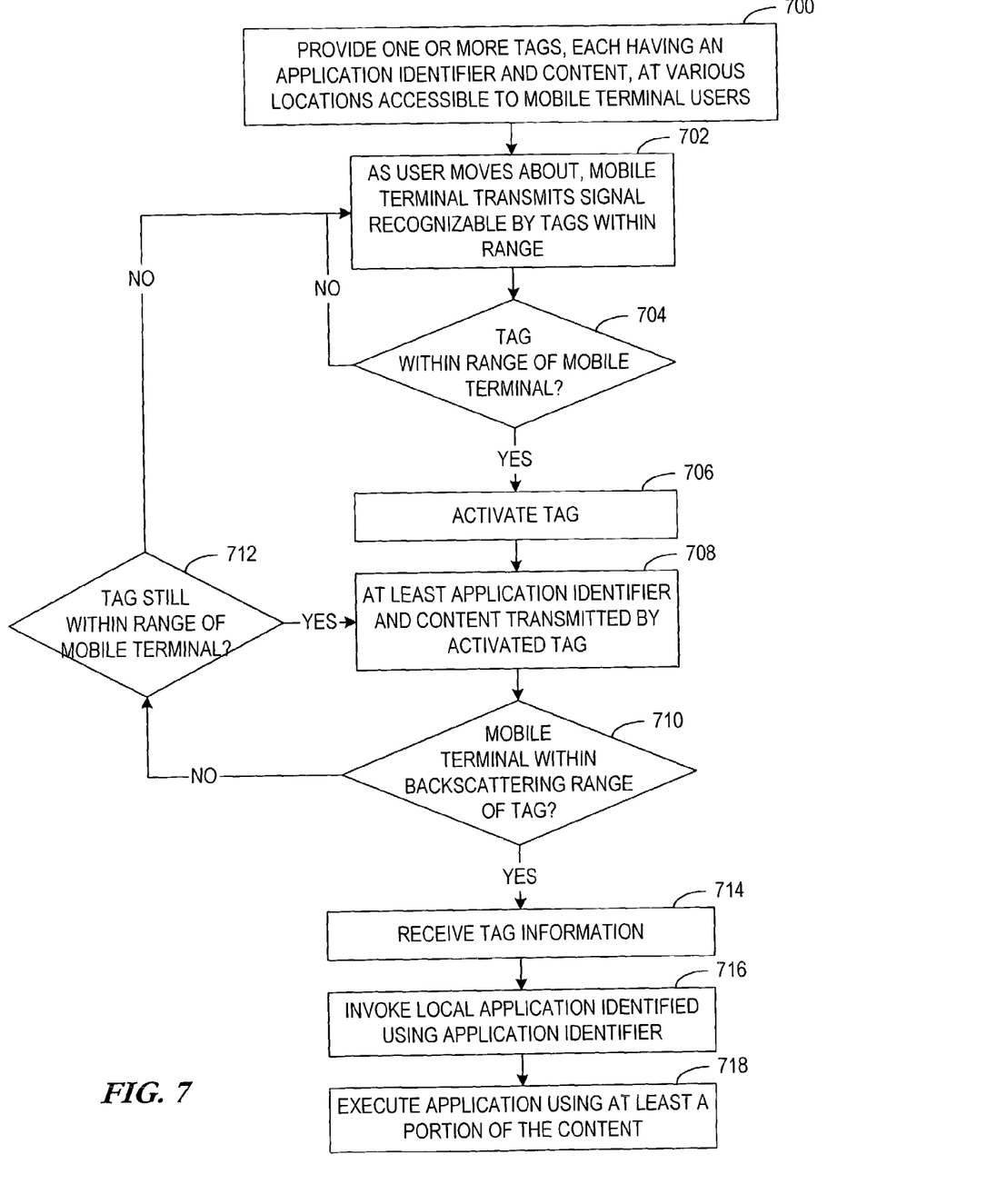
FIG. 7 is a flow diagram of an exemplary method for locating information via physical browsing by a mobile terminal in accordance with the present invention.

FIG. 7 is a flow diagram of an exemplary method for locating information via physical browsing by a mobile terminal in accordance with the present invention. One or more tags are provided 700, where each tag includes an application identifier and associated content. These tags can be provided at various locations that are accessible to mobile terminal users. As the user physically moves about with his/her mobile terminal, the mobile terminal can continuously, periodically, or at manually or automatically designated times transmit 702 a signal that is recognizable by the tags within the range of the signal. If a particular tag is within this range as determined at decision block 704, the tag is activated 706, and at least the application identifier and the content is transmitted 708 by the activated tag.

Because the transmission range of the mobile terminal and the backscattering range of the tag are not necessarily the same, it is determined 710 whether the mobile terminal is within the backscattering range of the tag. If not, the backscattering range may be less than the range of the mobile terminal, or the user may have moved out of range. If the tag is not still within range of the mobile terminal as determined at decision block 712, this would indicate that the user has moved away from the tag, and the process returns to block 702. If the tag is still within the range of the mobile terminal, the application identifier and content are transmitted 708 by the activated tag until the mobile terminal comes within the backscattering range. When the mobile terminal receives 714 the tag information, a local application identified using the application identifier is invoked 716. The application is executed 718 using at least a portion of the content provided by the tag, as previously set forth in the description herein.

Figure 8:
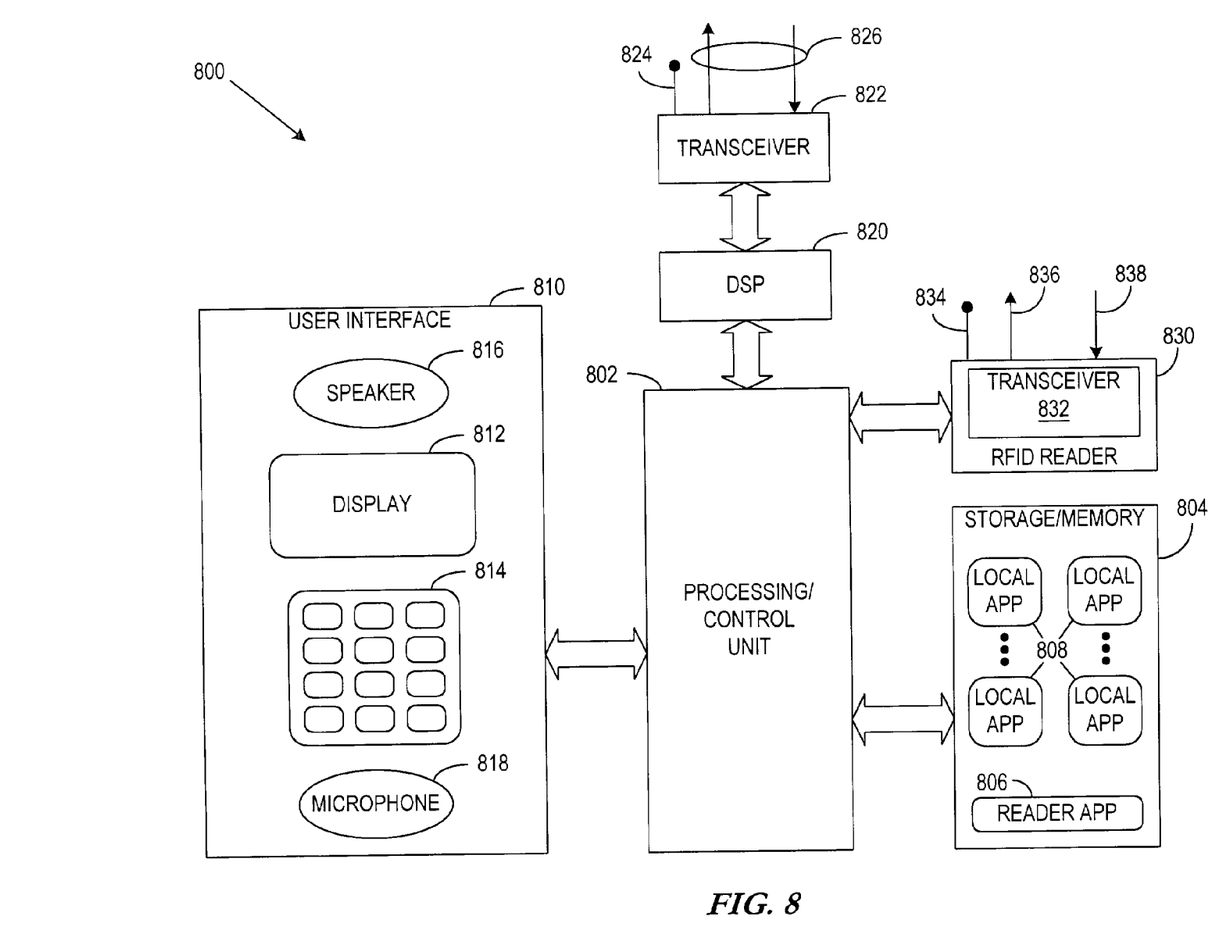
FIG. 8 illustrates a representative mobile terminal computing system capable of carrying out operations in accordance with the invention.

The mobile terminals described in connection with the present invention may be any number of wireless devices incorporating user profile information, such as wireless/cellular telephones, personal digital assistants (PDAs), or other wireless handsets, as well as portable computing devices capable of wireless communication. The mobile terminals utilize computing systems to control and manage the conventional device activity as well as the functionality provided by the present invention. Hardware, firmware, software or a combination thereof may be used to perform the various functions, display presentations and operations described herein. An example of a representative mobile terminal computing system capable of carrying out operations in accordance with the invention is illustrated in FIG. 8.

The exemplary mobile computing arrangement 800 suitable for performing the operations in accordance with the present invention includes a processing/control unit 802, such as a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile terminal as dictated by programs available in the program storage/memory. Thus, the processing unit 802 executes the functions associated with the physical browsing aspects of the present invention. More particularly, the program storage/memory 804 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The physical browsing modules associated with the present invention, such as the reader application 806 and local applications 808 that may be identified by application identifiers and invoked, may also be transmitted to the mobile computing arrangement 800 via data signals, such as being downloaded electronically via a network, such as the Internet and intermediary wireless networks.

The program storage/memory 804 may also be used to store data, such as the content provided by an RFID tag. In one embodiment of the invention, the content is stored in non-volatile electrically-erasable, programmable ROM (EEPROM), flash ROM, etc. so that the content is not lost upon power down of the mobile terminal.

The processor 802 is also coupled to user-interface 810 elements associated with the mobile terminal. The user-interface 810 of the mobile terminal may include, for example, a display 812 such as a liquid crystal display, a keypad 814, speaker 816, and microphone 818. These and other user-interface components are coupled to the processor 802 as is known in the art. The keypad 814 includes alpha-numeric keys for performing a variety of functions, including dialing numbers and executing operations assigned to one or more keys. For example, in accordance with the present invention, various functions associated with the network communications may be initiated and/or carried out by using the keypad 814. Alternatively, other user-interface mechanisms may be employed, such as voice commands, switches, touch pad/screen, graphical user interface using a pointing device, trackball, joystick, or any other user interface mechanism.

The mobile computing arrangement 800 may also include a digital signal processor (DSP) 820. The DSP 820 may perform a variety of functions, including analog-to-digital (AID) conversion, digital-to-analog (D/A) conversion, speech coding/decoding, encryption/decryption, error detection and correction, bit stream translation, filtering, etc. The transceiver 822, generally coupled to an antenna 824, transmits and receives the radio signals 826 between the wireless device and the network.

In connection with the present invention, the mobile computing arrangement 800 includes an RFID reader device 830, which includes a transceiver 832 and an antenna 834. The reader 830 transmits signals 836 which can be recognized by tags, thereby activating the tags. In response, the tags provide tag information signals 838, including the application identifier and content, which are provided to the reader application 806. The reader application determines which of the local applications 808 is to be invoked, based on the application identifier. The reader application 806 also provides the content to the appropriate application 808, once the appropriate application 808 has been identified. It should be recognized that the transceiver 822 used to establish wireless connections between the mobile device and the network can be used as the transceiver 832 associated with the RFID reader 830. However, because the transmissions performed with the network are high-frequency signals relative to the RF signals used in connection with the RFID reader 830, it may not be practical or possible to share the transceiver, although it is possible in some implementations.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile computing environments. For example, the physical browsing software modules in accordance with the present invention may be stored in a variety of manners, may be operable on a variety of processing devices, and may be operable in mobile devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, it will be apparent to those skilled in the art from the foregoing description that the invention is equally applicable to other current or future radio frequency identification technologies using, for example, electromagnetic/electrostatic coupling, and thus the present invention is not limited to "RFID" technology as this term is currently used. It is intended that the scope of the invention be limited not with this detailed description, but rather by the claims appended hereto.

What is claimed is:

1. A method comprising:
   transmitting a wireless signal from a mobile terminal to activate a transponder, the transponder having at least an application identifier and content associated therewith;
   receiving at least the application identifier and content from the activated transponder at the mobile terminal when physically located within a wireless transmission range of the transponder;
   invoking, at the mobile terminal, an application identified at least in part by the received application identifier; and
   providing the content received from the transponder to the invoked application for use by the invoked application when executed.

2. The method as in claim 1, further comprising establishing, in response to the invoked application, an over-the-air (OTA) connection to a network.

3. The method as in claim 2, wherein the invoked application comprises a Short Messaging Service (SMS) application, and wherein establishing an OTA connection to the network comprises transmitting an SMS push request, based at least in part on the content, to the network.

4. The method as in claim 2, wherein the invoked application comprises a Multimedia Messaging Service (MMS) application, and wherein establishing an OTA connection to the network comprises transmitting an MMS push request, based at least in part on the content, to the network.

5. The method as in claim 2:
   (a) wherein:
      (i) the invoked application comprises an SMS application;
      (ii) establishing an OTA connection to the network comprises transmitting an SMS push request, based at least in part on the content, to the network; and
   (b) further comprising:
      (i) receiving an SMS message from the network notifying the mobile terminal of an MMS access address; and
      (ii) invoking a browser application on the mobile terminal to access an MMS message via the MMS address.

6. The method as in claim 2, wherein the invoked application comprises a Wireless Application Protocol (WAP) browser, and wherein establishing an OTA connection to the network comprises establishing a WAP session to access, via the WAP browser, at least one network site identified by a URL provided via the content.

7. The method as in claim 2, wherein the invoked application comprises an Object Naming Service (ONS) inquiry application, and wherein establishing an OTA connection to the network comprises fetching a network address from an ONS server and initiating a WAP session to access, via a WAP browser, at least one network site identified by the network address provided from the ONS server.

8. The method as in claim 2, wherein the invoked application comprises a Java download application, and wherein establishing an OTA connection to the network comprises transmitting a Java MIDlet request, based at least in part on the content, to the network.

9. The method as in claim 1, wherein the invoked application comprises a mobile terminal configuration application, and wherein the content provided to the mobile terminal configuration application comprises mobile terminal configuration data.

10. The method as in claim 1, wherein the invoked application comprises a smart message interface application, and further comprising interfacing the smart message interface application to the transponder to receive the content as stand-alone content in a smart message format.

11. The method as in claim 10, further comprising accessing the stand-alone content on the mobile terminal.

12. The method as in claim 10, further comprising transmitting the stand-alone content to at least one other mobile terminal user.

13. The method as in claim 1, further comprising storing Java-related program segments as the content in the transponder.

14. The method as in claim 1, further comprising furnishing the transponder with power to transmit the application identifier and the content using the wireless signal transmitted by the mobile terminal.

15. The method as in claim 14, further comprising enhancing the wireless transmission range of the transponder by providing a separate power source at the transponder.

16. The method as in claim 1, wherein receiving the application identifier and the content comprises receiving a radio frequency identification (RFID) backscattered signal from the transponder.

17. The method as in claim 1, wherein activating the transponder comprises transmitting the signal via the wireless terminal when the transponder is within a wireless transmission range of the wireless terminal.

18. The method as in claim 1, wherein providing at least one transponder comprises providing a plurality of transponders at locations substantially accessible to the mobile terminal users, and wherein each of the transponders comprises at least an application identifier and content.

19. The method as in claim 1, wherein providing at least one transponder comprises providing at least one transponder having at least the application identifier, the content, and tariff information corresponding to a cost of invoking the application.

20. The method as in claim 19, further comprising establishing purchase parameters on the mobile terminal to allow or disallow access to the content based on at least the purchase parameters and the cost of invoking the application.

21. A method comprising:
 transmitting a radio frequency activation signal from a mobile terminal;
 causing activation of a transponder in response to the radio frequency activation signal when the transponder is within a radio frequency transmission range of the mobile terminal;
 receiving at least an application identifier and content from the activated transponder at the corresponding mobile terminal when the mobile terminal is within a backscatter transmission range of the transponder;
 locating a local application on the mobile terminal identified at least in part by the received application identifier;
 providing the content to the local application; and
 executing the local application using at least a portion of the content.

22. An apparatus comprising:
 a transceiver configured to:
  transmit a wireless signal to activate a transponder, the transponder having at least an application identifier and content associated therewith; and
  receive at least the application identifier and content from the activated transponder when physically located within a wireless transmission range of the transponder; and
 a processor coupled to the transceiver and configured to:
  invoke an application identified at least in part by the application identifier; and
  provide the content received from the transponder to the invoked application for use by the invoked application when executed.

23. The apparatus as in claim 22, further comprising a second transceiver to effect over-the-air communication with a network.

24. The apparatus as in claim 23, wherein the invoked application comprises a Short Messaging Service (SMS) application, and wherein the processor is further configured to transmit an SMS push request, based at least in part on the content, to the network via the second transceiver as directed by the SMS application.

25. The apparatus as in claim 23, wherein the invoked application comprises a Multimedia Messaging Service (MMS) application, and wherein the processor is further configured to transmit an MMS push request, based at least in part on the content, to the network via the second transceiver as directed by the MMS application.

26. The apparatus as in claim 23, wherein the invoked application comprises a Wireless Application Protocol (WAP) browser, and wherein the processor is further configured to establish a WAP session to access, via the WAP browser and second transceiver, at least one network site identified by a URL provided via the content.

27. The apparatus as in claim 23, wherein the invoked application comprises an Object Naming Service (ONS) inquiry application, and wherein the processor is further configured to fetch a network address from an ONS server as directed by the ONS inquiry application and initiate a WAP session to access, via a WAP browser and the second transceiver, at least one network site identified by the network address provided from the ONS server.

28. The apparatus as in claim 23, wherein the invoked application comprises a Java download application, and wherein the processor is further configured to transmit a Java application request, based at least in part on the content, to the network via the second transceiver as directed by the Java download application.

29. The apparatus as in claim 23, wherein the invoked application comprises a mobile terminal configuration application, and wherein the processor is further configured to update configuration settings on the mobile terminal using mobile terminal configuration data provided via the content.

30. The apparatus as in claim 23, wherein the invoked application comprises a smart messaging application, and wherein the processor is further configured to interface with the transponder update configuration settings on the mobile terminal using mobile terminal configuration data provided with the content.

31. The apparatus as in claim 22, wherein the apparatus comprises a wireless telephone.

32. The apparatus as in claim 22, wherein the apparatus comprises one of a personal digital assistant (PDA) and portable computer.

33. The apparatus as in claim 22, further comprising memory coupled to the processor that stores a reader application and the application identified by the application identifier, wherein the processor is further configured to provide the content received from the transponder to the local invoked application as directed by the reader application.

34. A system comprising:
   at least one transponder having at least an application identifier and content stored thereon, wherein the transponder is capable of transmitting the application identifier and the content in response to a wireless signal;
   at least one mobile terminal, comprising:
     (a) a transceiver configured to transmit the wireless signal to activate the transponder, and to receive at least the application identifier and content when physically located within a wireless transmission range of the transponder;
     (b) a processor coupled to the transceiver and configured to invoke an application identified at least in part by the application identifier and to provide the content received from the transponder to the invoked application for use by the invoked application when executed.

* * * * *